US007082209B2

(12) United States Patent
Ito et al.

(10) Patent No.: US 7,082,209 B2
(45) Date of Patent: *Jul. 25, 2006

(54) OBJECT DETECTING METHOD AND OBJECT DETECTING APPARATUS AND INTRUDING OBJECT MONITORING APPARATUS EMPLOYING THE OBJECT DETECTING METHOD

(75) Inventors: Wataru Ito, Kodaira (JP); Hirotada Ueda, Kokubunji (JP); Toshimichi Okada, Zama (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 601 days.

This patent is subject to a terminal disclaimer.

(21) Appl. No.: 09/933,164

(22) Filed: Aug. 21, 2001

(65) Prior Publication Data

US 2002/0041698 A1 Apr. 11, 2002

(30) Foreign Application Priority Data

Aug. 31, 2000 (JP) ............................. 2000-262581

(51) Int. Cl.
*G06K 9/00* (2006.01)

(52) U.S. Cl. ...................... 382/103; 382/218; 348/169

(58) Field of Classification Search ................ 387/103, 387/312; 382/218, 294, 103, 107, 173, 171, 382/104; 348/169, 152, 352, 699; 342/75, 342/76; 235/411; 378/98.11
See application file for complete search history.

(56) References Cited

U.S. PATENT DOCUMENTS 4,937,878 A 6/1990 Lo et al.
5,473,364 A 12/1995 Burt (Continued)

FOREIGN PATENT DOCUMENTS

JP 11331821 11/1999

(Continued)

OTHER PUBLICATIONS

R. Horton, "A Target Cueing and Tracking System (TCATS) for Smart Video Processing" Proceedings of the International Carnahan Conference on Security Technology: Crime Countermeasures, Lexington, Oct. 10-12, 1990, pp. 68-72.

(Continued)

*Primary Examiner*—Barry Choobin
(74) *Attorney, Agent, or Firm*—Mattingly, Stanger, Malur & Brundidge, P.C.

(57) ABSTRACT

An object detecting method, object detecting apparatus and intruding object monitoring apparatus employing the object detecting method. A predetermined monitor area having no object to be detected is imaged by an imaging device and reference background sequential images are registered in advance in a storage unit. When monitoring, the predetermined monitor area is imaged by the imaging device while at the same time sequentially outputting the images frame by frame from the imaging device, a reference background image corresponding to the image from the imaging device is selected from the reference background sequential images, subtraction processing is carried out between the image from the imaging device and a corresponding reference background image, and the object detecting processing is carried out based on the result of subtraction processing.

35 Claims, 12 Drawing Sheets

U.S. PATENT DOCUMENTS

| | | | |
|---|---|---|---|
| 5,606,376 A | 2/1997 | Shinohara | |
| 5,798,787 A * | 8/1998 | Yamaguchi et al. | 348/152 |
| 6,088,468 A | 7/2000 | Ito et al. | |
| 6,108,033 A * | 8/2000 | Ito et al. | 348/152 |
| 6,219,468 B1 * | 4/2001 | Yukawa et al. | 382/312 |
| 6,226,388 B1 * | 5/2001 | Qian et al. | 382/103 |
| 6,507,366 B1 * | 1/2003 | Lee | 348/352 |
| 6,754,367 B1 * | 6/2004 | Ito et al. | 382/103 |
| 2001/0012001 A1 * | 8/2001 | Rekimoto et al. | 345/173 |
| 2001/0024233 A1 * | 9/2001 | Urisaka et al. | 348/213 |
| 2002/0008758 A1 * | 1/2002 | Broemmelsiek et al. | 348/143 |
| 2003/0174253 A1 * | 9/2003 | Ito et al. | 348/699 |

FOREIGN PATENT DOCUMENTS

| | | |
|---|---|---|
| JP | 200090277 | 3/2000 |
| WO | 9945511 | 9/1999 |

OTHER PUBLICATIONS

E. Meijering, et al "A Fast Image Registration Technique for Motion Artifact Reduction in DSA" Image Processing, 1999, ICIP 99, Proceedings 1999 International Conference on Kobe, Japan, Oct. 24-28, 1999, pp. 435-439.

* cited by examiner

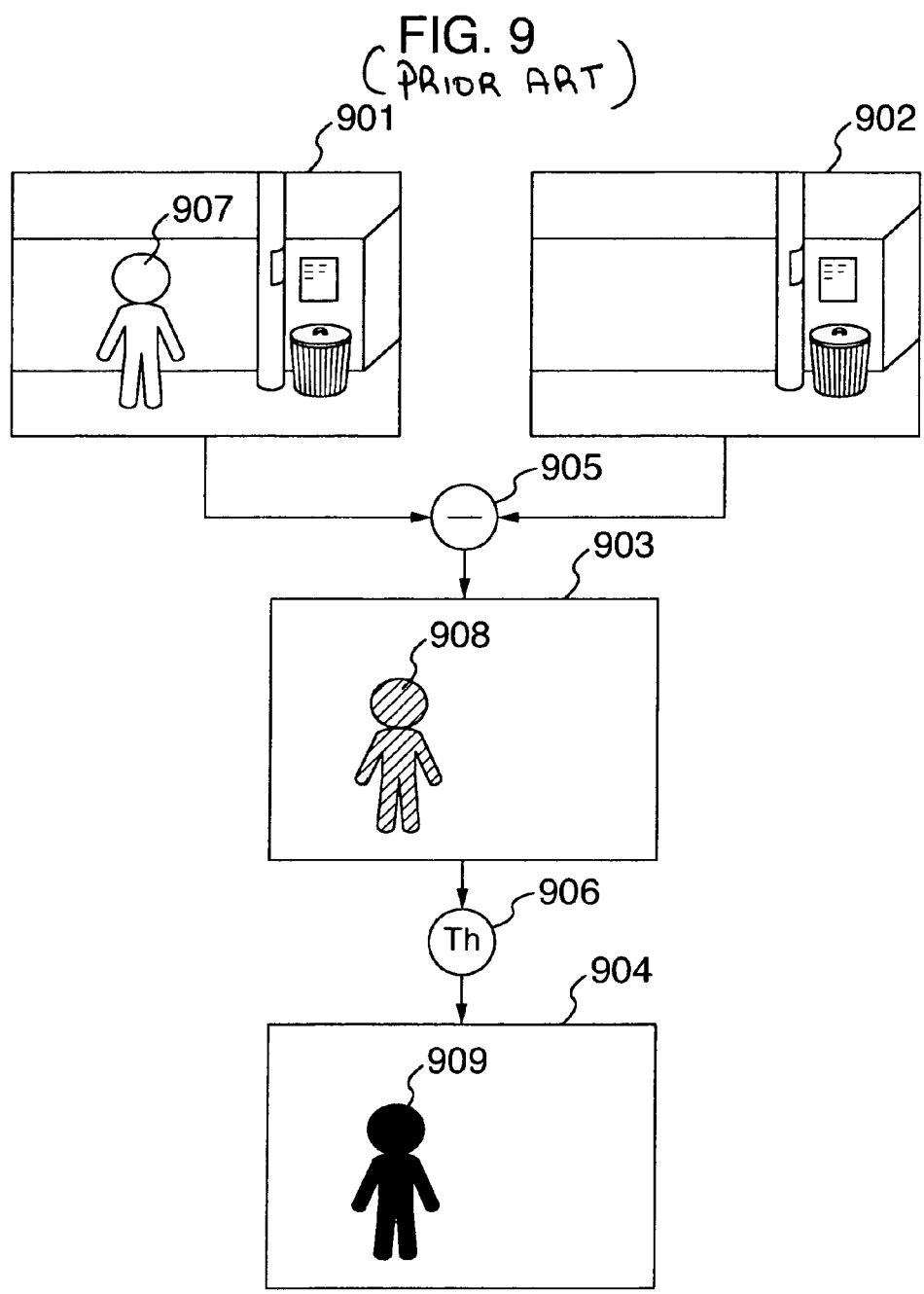

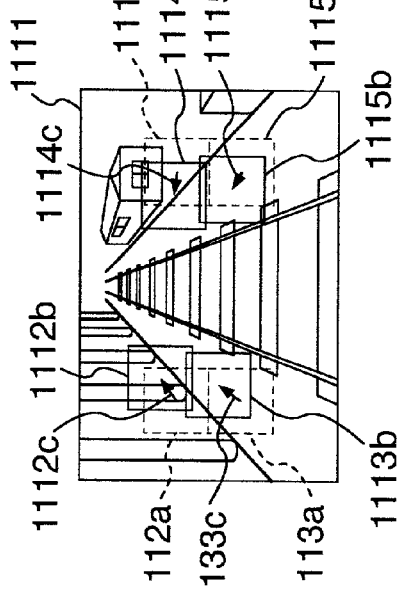
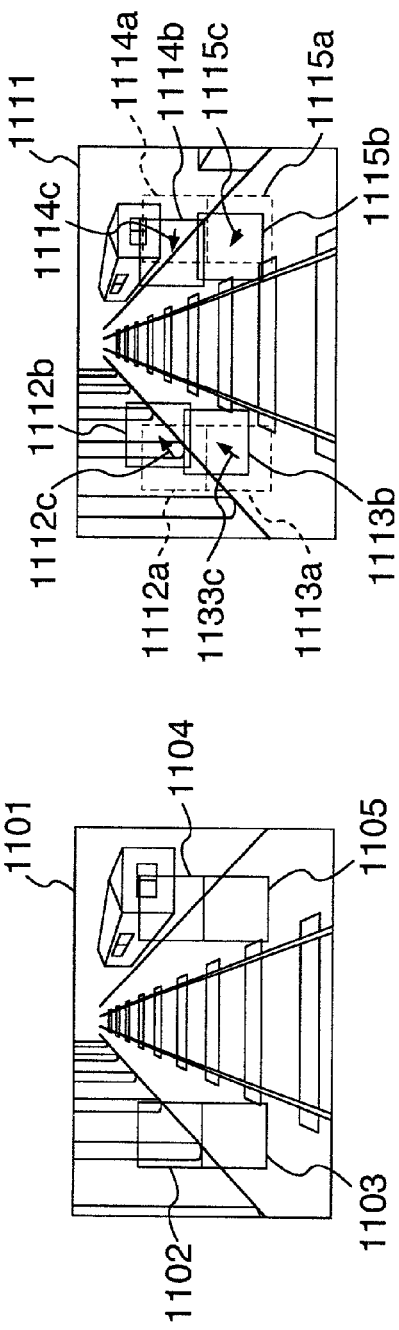
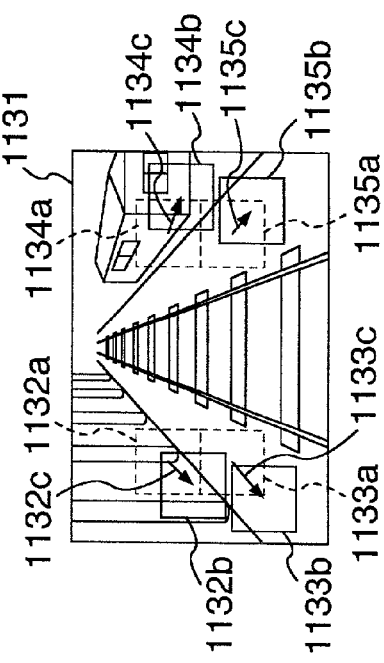
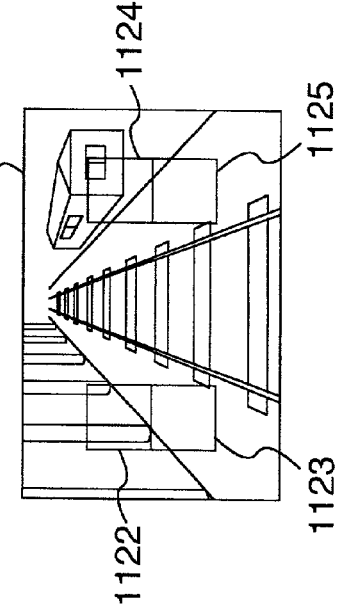

OBJECT DETECTING METHOD AND OBJECT DETECTING APPARATUS AND INTRUDING OBJECT MONITORING APPARATUS EMPLOYING THE OBJECT DETECTING METHOD

BACKGROUND OF THE INVENTION

The present invention relates to the detection of an object using an imaging device, or in particular to an object detecting method and an object detecting apparatus and an intruding object monitoring apparatus for automatically detecting an object intruding into the monitoring visual field by scanning a predetermined monitor area with the imaging device while changing the zoom setting of the zoom lens of the imaging device, changing the imaging direction of the imaging device or moving the imaging device, thereby changing the monitoring visual field.

An intruding object detecting apparatus using an imaging device such as a camera has been widely used. In recent years, however, demand has arisen for an intruding object detecting apparatus in which an intruding object such as a person or an automobile (vehicle) intruding into a monitoring visual field is detected not by a person watching the image displayed on a monitor, but automatically by the image signal input from the imaging device and a predetermined announcement or alarm is issued by appropriate means.

In order to realize such an intruding object detecting apparatus, first, an inputted image from the imaging device is compared with an image in which an object to be detected is not present, such as a reference background image, an input image which has been previously obtained or the like, through image processing and a difference therebetween is detected. For example, an input image and a reference background image in which an object to be detected is not present are compared with each other, a difference in the brightness or luminance value for each pixel is detected and an area of pixels that have large difference values is detected as an intruding object. This method for obtaining a difference is known as "subtraction method" and has been widely used.

The processing by the subtraction method will be explained with reference to FIG. 9. FIG. 9 is a diagram for explaining the principle of processing the object detection according to the subtraction method. Reference numeral 901 designates an input image, numeral 902 a reference background image, numeral 903 a difference image, numeral 904 a binarized image of the difference image 903, numeral 905 a subtractor, numeral 906 a binarizer, numeral 907 an person-like object picked up in the input image 901, numeral 908 an area generated by the subtraction, and numeral 909 an image of a cluster of the brightness values "255" binarized from the area 908 generated by the subtraction.

In FIG. 9, the subtractor 905 calculates the difference of the brightness value or luminance value between the input image 901 and the reference background ground image 902 for each pixel, and outputs the difference image 903. In the difference image 903, a person-like object 907 picked up in the input image 901, for example, is applied to the binarizer 906 as an area 908 where the difference has been generated between the reference background image 902 and the input image 901.

The binarizer 906 produces a binarized image 904 by determining the brightness value of each pixel less than a predetermined threshold value Th as "0" and the brightness value of the pixel not less than the threshold value Th as "255" (the brightness value of one pixel calculated as 8 bits). The person-like object 907 picked up in the input image 901 in this way is calculated as an area 908 for which a difference is generated by the subtractor 905, and detected by the binarizer 906 as an image 909 indicating a cluster of pixels having the brightness value of "255".

SUMMARY OF THE INVENTION

As described above, the subtraction method requires the preparation of a reference background image where an intruding object to be detected is not present. In the case where the viewing angle or the viewing direction become different from the reference background image as a result of changing the zoom setting of the zoom lens or the imaging direction of the imaging device or moving the imaging device to change the visual field of the camera, however, the reference background image prepared in advance becomes of no use, thereby posing the problem that the subtraction method is not applicable in this case. Even if an attempt is made to prepare a new reference background image, the object detection becomes impossible to do during the preparation. In the conventional intruding object detecting method according to the subtraction method, therefore, it is practically impossible to detect an intruding object while changing the zoom setting or the imaging direction of the imaging device or moving the imaging device itself.

Accordingly, the object of the present invention is to obviate the disadvantages of the prior art described above, and to provide an object detecting method, an object detecting apparatus and an intruding object monitoring apparatus which are reliable and capable of detecting an object such as an intruding object even in the case where the zoom setting or the imaging direction of the imaging device is changed.

According to one aspect of the invention, there is provided an object detecting method for detecting an object in a predetermined monitor area, comprising the steps of:

imaging a plurality of different areas in the predetermined monitor area having no object to be detected at a predetermined time by an imaging device and registering a plurality of images corresponding to the different areas having no image of the object to be detected;

at a different time from the predetermined time, imaging the predetermined monitor area by the imaging device;

comparing an image from the imaging device with a corresponding one of the plurality of registered images; and detecting the object to be detected based on a result of the comparison.

In one embodiment, the plurality of registered images having no image of the object to be detected are reference background sequential images (a group of reference background images) and the step of comparing is subtraction processing between the image from the imaging device and the corresponding one of the reference background sequential images.

The imaging visual field of the imaging device in imaging operation undergoes a change every moment. According to the present method of object detection, however, the subtraction processing can be carried out in such a manner that a reference background image most coincident with the present imaging visual field (or the image picked up in the particular imaging visual field) can be selected from the reference background sequential images.

According to a preferable feature of the invention, this object detecting method includes the step of detecting a displacement between the image from the imaging device and a corresponding reference background image, then correcting the image from the imaging device in accordance with the detected displacement, wherein the subtraction processing is carried out between the corrected image and the corresponding reference background image.

Specifically, in the case where the imaging visual field is changed by moving the imaging device, the imaging device trembles and develops a displacement, so that there also occurs a displacement between the image from the imaging device and a reference background image. This displacement is detected erroneously as an object at the time of object detection, i.e. in the subtraction and subsequent process. In order to remove this displacement, the step of detecting the displacement preferably includes the step of applying a template matching between the image from the imaging device and the corresponding reference background image to detect the displacement.

According to an embodiment, in the template matching step, a plurality of sections are set on the reference background image, and the image of each section is used as a template which is used for template matching with the image from the imaging device, and the average of the displacements detected is used as the displacement.

Another preferable feature of the invention is that the object detecting method described above comprises the step of detecting a frame displacement between the frame of the image from the imaging device and the frame of the corresponding reference background image, wherein when there is any frame displacement, another reference background image is selected.

In other words, it is critical to select a proper reference background image when carrying out the subtraction process. In the case where a proper reference background image is not selected from the reference background sequential images and a frame displacement occurs, the background portion would be displaced between the image from the imaging device and the selected reference background image, and the particular displacement would be detected erroneously as an object at the time of object detection, i.e. in the subtraction and subsequent steps. In order to remove this displacement, the frame displacement detecting step preferably includes the step of applying a template matching between the image from the imaging device and the corresponding reference background image to detect the frame displacement.

According to an embodiment, in the template matching step, a plurality of sections are set on the corresponding reference background image, and using the image of each section as a template, the template matching is carried out with the image from the imaging device. In accordance with the frame displacement information thus detected, a reference background image of the frame temporally preceding or succeeding to the frame of the reference background image is selected.

As an alternative, preferably, the frame displacement detecting step is such that the frame displacement is corrected based on at least one of the position of the imaging device and the imaging visual field information of the imaging device.

According to an embodiment, a specific position of the imaging device and a specific frame of the reference background image corresponding to the specific position are set in association with each other in advance, and when the imaging device arrives at the specific position, the frame displacement is corrected using the reference background image of the specific frame.

According to an embodiment, the imaging visual field information contains a specific object within the predetermined monitor visual field as a mark, and this mark and the reference background image of a specific frame corresponding to the mark are set in association with each other in advance. When the imaging device picks up the image of the mark, the frame displacement is corrected using the reference background image of the specific frame.

According to a further preferable feature of the invention, the object detecting method includes the step of updating the reference background sequential images to update at least one of the reference background sequential images.

According to an embodiment, the update step functions in such a manner that when an object to be detected is not detected in the image from the imaging device in the object detection processing step, the corresponding reference background image is updated with the image.

According to another aspect of the invention, there is provided an object detecting method for detecting an object, comprising the steps of:

imaging a plurality of different areas in a predetermined monitor area at a predetermined time by the imaging device in accordance with a predetermined scanning pattern, and registering respective reference background sequential images corresponding to the different areas in a storage device;

at a different time from the predetermined time, imaging the predetermined monitor area with the imaging device substantially in accordance with the predetermined scanning pattern in synchronism with the operation of reading the registered reference background sequential images from the storage device;

carrying out the subtraction processing between the images from the imaging device and the reference background sequential images read out; and carrying out object detecting processing based on a result of the subtraction processing.

The predetermined scanning pattern includes a predetermined chronological change of at least one or a combination of two or more of, for example, the zoom ratio of the zoom lens of the imaging device, the imaging direction and the travel route of the imaging device.

According to an embodiment, the predetermined scanning pattern is obtained by the imaging device moving on a predetermined speed profile along a predetermined travel route.

According to another embodiment, the predetermined scanning pattern includes a pattern in which the position of the imaging device is fixed while the zoom ratio and the imaging direction of the imaging device periodically change.

Another preferable feature of the invention is that the reference background sequential images are a set of images obtained by scanning the predetermined monitor area having no object with the imaging device according to the predetermined scanning pattern and sampling the frame images from the imaging device at predetermined sampling intervals. In the registration step, each reference background frame image of the reference background sequential images is registered with a frame number assigned in order of imaging or sampling. In the imaging step, on the other hand, the imaging operation of the imaging device and the operation of reading the reference background image from the registration device are carried out in synchronism with each other using the frame number, so that a reference background image corresponding to the image from the imaging device is selected from the reference background sequential images.

According to an embodiment, the frame number of the corresponding reference background image is calculated from the relation between the time elapsed from the start of monitoring to the present point in time and the predetermined sampling interval, and the imaging operation of the imaging device and the operation of reading the reference background image from the registration device are synchronized with each other using the calculated frame number.

Another preferable feature of the invention lies in the step of detecting a frame displacement between the image from the imaging device and the selected reference background image, wherein in the presence of a frame displacement, a different reference background image is selected.

Still another preferable feature of the invention lies in the step of detecting a spatial displacement between the image from the imaging device and the reference background image that has been read and correcting the read image in accordance with the detected spatial displacement, wherein the subtraction processing is carried out using the corrected image.

According to still another aspect of the invention, there is provided an object detecting apparatus for detecting an object located within a predetermined monitor area, comprising:

an imaging device;

an image input interface connected to the imaging device for converting a video signal of the imaging device to image data;

a processing unit including a central processing unit and a memory for processing the image data; and a bus for interconnecting the image input interface and the processing unit;

wherein in order to detect the object, the processing unit controls the object detecting apparatus such that:

images from the imaging device imaging the predetermined monitor area having no object to be detected are stored sequentially in the memory;

an image from the imaging device imaging the predetermined monitor area is sequentially inputted to the processing unit;

an image having no object to be detected corresponding to the inputted image is read out of the image memory; and the input image and the read image having no object to be detected are compared and based on a result of comparison, object detection processing is carried out.

An embodiment of the invention includes a zoom lens control unit connected to the bus for changing the zoom ratio of the zoom lens of the imaging device and a pan and tilt head control unit for changing the imaging direction of the imaging device.

According to another embodiment, the imaging device is mounted on a moving device.

According to an embodiment, the moving device includes a mobile unit.

According to another embodiment, the moving device includes a pan and tilt head.

According to yet another aspect of the invention, there is provided an object detecting apparatus for detecting an object within a predetermined monitor area, comprising:

an imaging device;

an image input interface connected to the imaging device for converting the video signal from the imaging device to image data;

a processing unit including a central processing unit and a memory for processing the image data; and a bus for interconnecting the image input interface and the processing unit;

wherein in order to detect the object, the processing unit controls the object detecting apparatus such that:

an image from the imaging device imaging the predetermined monitor area having no object to be detected is recorded in the image memory beforehand as a reference background image of reference background sequential images;

an image from the imaging device imaging the predetermined monitor area in accordance with a predetermined scanning pattern is sequentially input to the processing unit;

a reference background image is read out of the reference background sequential images from the image memory in synchronism with the imaging of the input images; and a difference in a pixel value for each pixel between the input images and the read reference background image is calculated, and an area associated with a large difference value is detected as the object.

According to a further aspect of the invention, there is provided a monitoring apparatus for monitoring an object intruding into a predetermined monitor area, comprising:

an imaging device;

an image input interface connected to the imaging device for converting a video signal from the imaging device to image data;

a processing unit including a central processing unit and a memory for processing the image data;

a monitor; and a bus for interconnecting the image input interface and the processing unit;

wherein the processing unit controls the monitoring apparatus such that:

each n-th one of the frame images output from the imaging device imaging the predetermined monitor area having no object to be detected is recorded in the memory beforehand as reference background sequential images, where n is an integer not less than unity;

an image from the imaging device imaging the predetermined monitor area is sequentially input to the processing unit;

a reference background image corresponding to the input image is read from the memory; and a difference in a pixel value between the input image and the reference background image corresponding to the input image read is calculated for each pixel, and an area associated with a large difference value is detected as an intruding object and displayed on the monitor.

According to a yet further aspect of the invention, there is provided a monitoring apparatus for monitoring an object intruding into a predetermined monitor area, comprising:

an imaging device;

an image input interface connected to the imaging device for converting a video signal from the imaging device to image data;

a processing unit including a central processing unit and a memory for processing the image data;

a monitor; and a bus for interconnecting the image input interface, the processing unit and the monitor;

wherein the processing unit controls the monitoring apparatus such that:

each n-th frame image output from the imaging device imaging the predetermined monitor area having no object to be detected is recorded in the image memory beforehand as reference background sequential images, where n is an integer not less than unity;

images from the imaging device imaging the predetermined monitor area in accordance with a predetermined scanning pattern are sequentially input to the processing unit;

reference background sequential images are read from the image memory in synchronism with the imaging of the input images; and a difference in a pixel value between an input image and a reference background image read is calculated for each pixel, and the area associated with a large difference value is detected as an intruding object and displayed on the monitor.

BRIEF DESCRIPTION OF THE DRAWINGS

The foregoing and other objects, features and advantages of the invention will be apparent from the following more particular description of the embodiments of the invention as illustrated in the accompanying drawings wherein:

FIG. 9 is a diagram for explaining the principle of the processing according to the background image subtraction method;

FIGS. 11A, 11B, 11C, 11D are diagrams for explaining the correction of the frame displacement by template matching.

DESCRIPTION OF THE EMBODIMENTS

Figure 1:
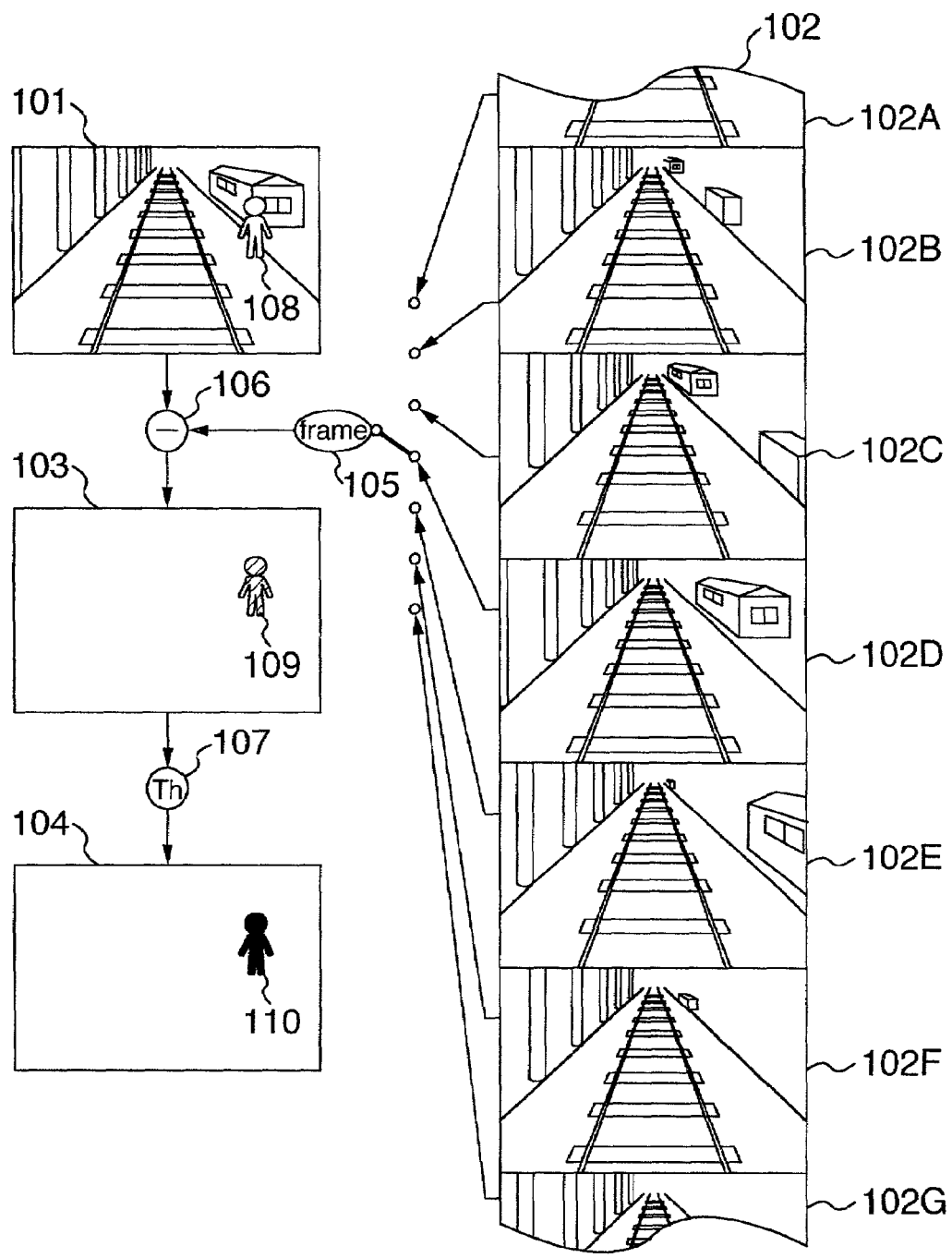
FIG. 1 is a diagram for explaining an embodiment of the invention.

Embodiments of the invention will be explained below with reference to the drawings. In all the drawings, similar component parts are designated by similar reference numerals, respectively.

Figure 2:
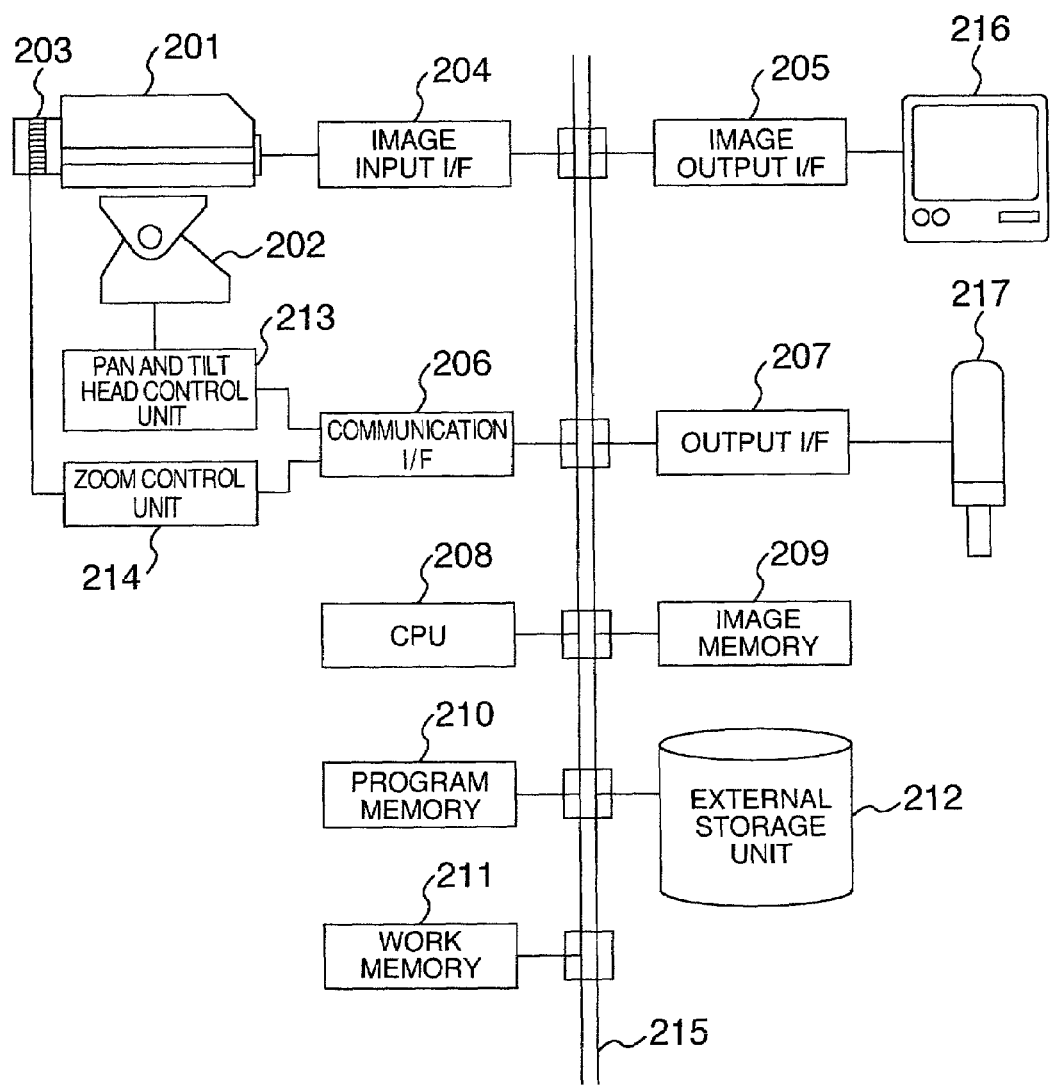
FIG. 2 is a block diagram showing a configuration of an intruding object monitoring apparatus according to an embodiment of the invention.

An intruding object monitoring apparatus according to an embodiment of the invention will be described with reference to FIG. 2. FIG. 2 is a block diagram showing a hardware configuration of an intruding object monitoring apparatus.

Reference numeral 201 designates a television camera (hereinafter referred to as the TV camera), numeral 202 a pan and tilt head, numeral 203 a zoom lens, numeral 204 an image input I/F, numeral 205 an image output I/F, numeral 216 a monitor, numeral 215 a data bus, numeral 206 a communication I/F, numeral 213 a pan and tilt head control unit, numeral 214 a zoom control unit, numeral 207 an output I/F, numeral 217 an alarm lamp, numeral 208 a CPU (central processing unit), numeral 209 an image memory, numeral 210 a program memory, numeral 211 a work memory, and numeral 212 an external storage device. The TV camera 201 is mounted on the pan and tilt head 202 and includes the zoom lens 203. The pan and tilt head 202 is connected to the pan and tilt head control unit 213. The zoom lens 203 is connected to the zoom control unit 214. The pan and tilt head control unit 213 and the zoom control unit 214 are connected to the communication I/F 206. The TV camera 201 is connected to the image input I/F 204. The monitor 216 is connected to the image output I/F 205. The alarm lamp 217 is connected to the output I/F 207. Also, the image input I/F 204, the image output I/F 205, the communication I/F 206, the output I/F 207, the CPU 208, the image memory 209, the program memory 210, the work memory 211 and the external storage device 212 are connected to the data bus 215.

In FIG. 2, the TV camera 201 images a portion of the monitor area entering the monitor visual field thereof. The intruding object monitoring apparatus picks up the image of the whole monitor area by scanning with the TV camera 201 by operating the pan/tilt head 202 and the zoom lens 303.

The pan and tilt head 202 changes the imaging direction of the TV camera 201 by a pan and tilt head control signal from the pan and tilt head control unit 213. The zoom lens 203 changes the zoom ratio of the zoom lens by a zoom control signal of the zoom control unit 214.

The TV camera 201 converts the image picked up into a video signal, and the video signal thus converted is input to the image input I/F 204. The image input I/F converts the input video signal into the image data of a format (320 pixels wide, 240 pixels tall and 8 bits/pixel, for example) handled by the intruding object monitoring apparatus, and the resulting image data are sent to the image memory 209 through the data bus 215. The image data thus sent in are stored in the image memory 209. In accordance with the amount of image data thus stored, the image data are transferred from the image memory 209 to the external storage device 212.

The CPU 208 analyzes the image stored in the image memory 209 in the work memory 211 in accordance with the program held in the program memory 210.

As a result of the analysis described above, if information or related information is acquired as to whether an object has intruded into the imaging visual field of the TV camera 201 or not, then, in accordance with the processing result, the CPU 208 causes the pan and tilt head control signal to be transmitted from the data bus 215 through the communication I/F 206 to the pan and tilt head control unit 213 on the one hand and causes the zoom control signal to be transmitted through the communication I/F 206 to the zoom control unit 214 on the other.

Further, the CPU 208 causes a processing result image, for example, to be displayed on the monitor 216 through the image output I/F 205 and turns on the alarm lamp 217 through the output I/F 207. The communication I/F 206 converts the signal from the CPU 208 into a format (RS-232C signal, for example) that can be recognized by the pan and tilt head control unit 213 and the zoom control unit 214, and controls the zoom ratio of the zoom lens 203 and the pan-tilt motor of the pan and tilt head 202.

On the other hand, the image output I/F 205 converts the signal of the CPU 208 into a format (NTSC video signal, for example) that can be used by the monitor 216, and sends the resulting signal to the monitor 216. The monitor 216 displays the image of the result of detecting an intruding object, for example.

Figure 3:
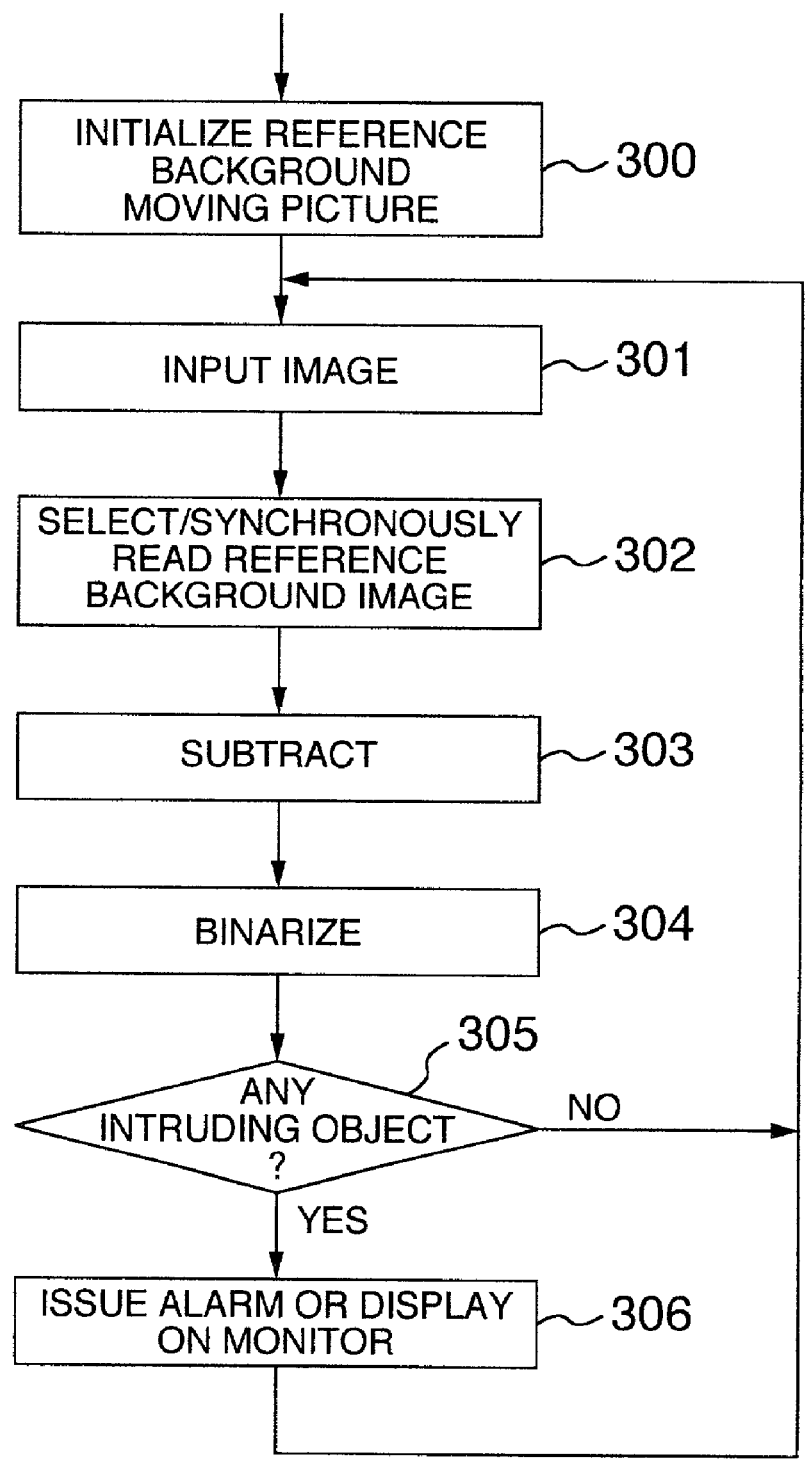
FIG. 3 is a flowchart showing the processing operation of an object detecting method according to one embodiment of the invention.

FIG. 3 is an example of a flowchart showing the processing operation according to an embodiment of the invention. The processing operation shown in the flowchart of FIG. 3 is executed by use of the intruding object monitoring apparatus shown in FIG. 2. According to this first embodiment, a reference background image corresponding to the input image picked up within the monitor visual field is selected from the reference background sequential images, i.e. a plurality of reference background images (reference background moving picture or a plurality of frames of reference background images) stored in the image memory 209 or the external storage device 212, and in this way an object that has intruded into the visual field of the TV camera 201 is detected by the subtraction method explained with reference to FIG. 9.

The reference background sequential images or a plurality of the reference background images are obtained by picking up images, as described later, in such a manner that the imaging direction is changed by moving the TV camera 201 or changing the imaging direction thereof using the pan and tilt head thereof in accordance with a predetermined scanning pattern while scanning the monitor area having no object to be detected and thus sequentially changing the monitor visual field of the monitoring apparatus. The "predetermined scanning pattern" is defined as a changing pattern of imaging conditions with time including the change in the predetermined imaging direction and the predetermined trajectory when moving the TV camera 201. The predetermined pattern may further include a changing pattern of a predetermined zoom ratio by which the zoom ratio of the zoom lens of the TV camera 201 is changed with time. In the description that follows, the brief wording "the predetermined change of the visual field of the monitoring apparatus" will be used to mean that "the TV camera 201 is moved in accordance with a predetermined scanning pattern or the imaging direction thereof is changed by the pan and tilt head thereof, while scanning the monitor area with the TV camera 201 thereby to successively change the monitor visual field of the monitoring apparatus".

Figure 10:
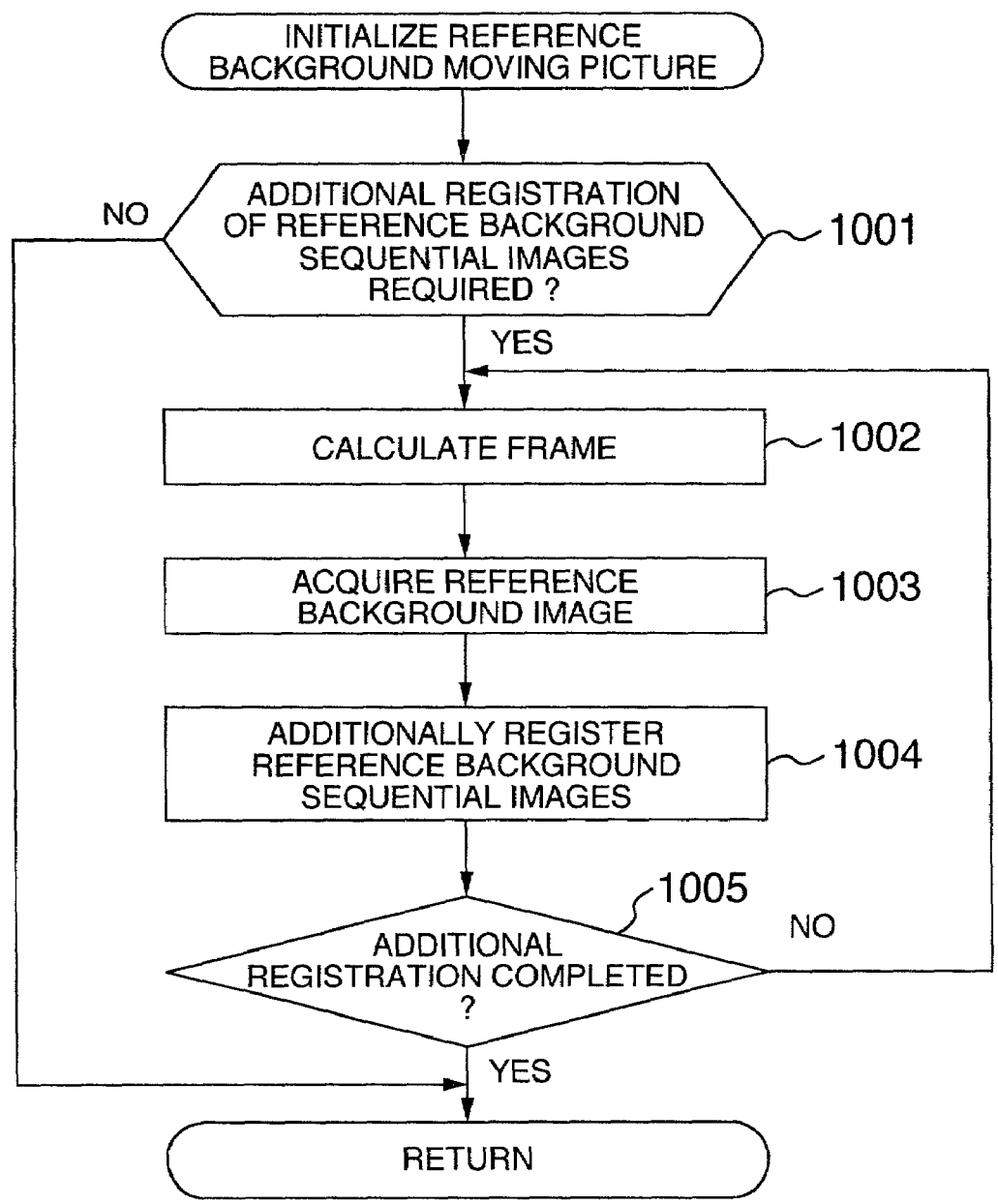
FIG. 10 is a flowchart showing a further detailed processing operation of the step of initializing the reference background image sequence in the object detecting method shown in FIGS. 3 to 6.

Referring to FIG. 3, first, in the reference background moving picture initialization step 300, the reference background sequential images (i.e. the reference background moving picture) is initialized. This process will be explained with reference to FIG. 10. FIG. 10 is a flowchart showing the flow of the process for initializing the reference background sequential images. In the process for initializing the reference background sequential images, the step 1001 for determining the need of additionally registering the reference background sequential images determines whether the reference background sequential images stored in the work memory 211 or the external storage device 212 holds all of the reference background images for the predetermined change of the monitor visual field of the monitoring apparatus. In the case where the reference background sequential images holds all of the reference background images (in the case where the reference background sequential images is prepared in advance for the predetermined change of the monitor visual field of the monitoring apparatus), it is determined that the additional registration of the reference background sequential images is not needed and the process for initializing the reference background sequential images is terminated (the process is returned to the image input step 301). In the case where all of the reference background images are not held or only partially held, on the other hand, it is determined that the additional registration of the reference background sequential images is required, and the process branches to the frame number calculation step 1002. The frame number calculation step 1002 calculates the frame number of the reference background sequential images to be added. The frame number is used for synchronization between the input image and the reference background images held in the reference background sequential images, and the frame number for the monitor start time is expressed, for example, as frame=0. In the case where the reference background images are held in the reference background sequential images at predetermined sampling intervals (30 frames per second, for example), the frame number of 300, for example, indicates that 10 seconds has passed from the monitor start time. In other words, the frame number of the reference background image corresponding to the input image applied at the time point 10 seconds after the monitor start time is given as frame=300. In the case where the reference background sequential images holds no reference background image at all, for example, the frame number calculation step 1002 sets the frame number to 0 expressed as frame=0 (indicating the starting point of the predetermined change of the monitor visual field of the monitoring apparatus (corresponding to the monitor visual field at the monitor start time point)). In the case where the reference background sequential images holds ten frames of the reference background images (indicating that ten frames have passed from the starting point of the predetermined change of the monitor visual field of the monitoring apparatus), it is assumed that frame=10. Then, in the reference background image acquisition step 1003, an input image of 320×240 pixels, for example, is acquired from the imaging device 201. Further, in the reference background sequential images additional registration step 1004, the input image acquired in the reference background image aquisition step 1003 is registered by being added to the reference background sequential images stored in the work memory 211 or the external storage device 212. In the additional registration completion determining step 1005, on the other hand, the initialization processing for the reference background sequential images is terminated (by returning to the image input step 301) in the case where the registration of all the reference background images by addition to the reference background sequential images is completed for the predetermined change of the monitor visual field of the monitoring apparatus. In the case where such additional registration is not yet complete, on the other hand, the process branches to the frame number calculation step 1002.

Returning to FIG. 3, in the image input step 301, the input video signal picked up by the TV camera 201 is acquired as an input image of 320×240 pixels, for example.

Then, in the reference background image select/sync read step 302, the reference background image 902 having an angle of view identical or most similar to the input image 901 obtained in the image input step 301 is selected from reference background sequential images (a plurality of the reference background sequential images or the reference moving picture).

According to this embodiment, in order to select a corresponding reference background image from a plurality of reference background images (i.e. the reference background sequential images), the synchronism between the input image and the reference background images is managed by the frame number (frame). The frame number of the monitor start time is determined as frame=0, for example, and the frame number is increased for each sampling interval of the reference background sequential images in accordance with the time elapsed from the monitor start time. Specifically, in the case where the reference background sequential images holds the reference background images sampled at the rate of 30 frames per second, for example, the frame number increases at the rate of 30 per second. In the reference background moving picture initialization step 300, the frame number of the reference background sequential images is calculated based on the start point of the predetermined change of the monitor visual field (corresponding to the monitor visual field at monitor start time point) of the monitoring apparatus (1002), the reference background sequential images is acquired (1003), and registered by being added to the reference background sequential images (1004). Take FIG. 12 as an example. The predetermined change of the monitor visual field is defined as the change of the imaging visual field from 1202a, 1202b, 1202c, 1202d, 1202e, 1202e, 1202d, 1202c, 1202b, 1202a in that order. With this predetermined change of the monitor visual field, the reference background images 0 to 9 of the visual field of the nine frame numbers of frames=0 to 9 are held in the reference background sequential images. At the monitor start time point, the visual field of the imaging device is 1202a, and with the lapse of time, the visual field changes from 1202a, 1202b, 1202c, 1202d, 1202e, 1202e, 1202d, 1202c, 1202b, 1202a in that order, while at the same time increasing the frame number from 0 to 9. As a result, according to the frame number (frame), the reference background image acquired in the same visual field as the input image can be selected from the reference background sequential images in the reference background image select step 302. As a result, synchronism can be achieved between the input image and the reference background image to be selected.

In other words, the frame number (frame) is used as a counter for selecting the reference background image corresponding to the input image from the reference background sequential images, and increases, as described above, at the rate of 30/sec (when pickedup with a TV camera conforming to television broadcasting in NTSC system) from the monitor start time (reference time point) of frame=0. In the case where frame=300, for example, it indicates that ten seconds has passed from the reference time point, and therefore the reference background image associated with 10 seconds following the reference time point is selected.

According to this embodiment, the sampling interval of the reference background image is equal to the frame interval of the video signal of the TV camera. Nevertheless, the sampling interval can be determined arbitrarily without regard to the video signal. In other words, every n-th frame image from the TV camera 101 can be used as a reference background image, where n is not limited to 1 but may be an integer of 2 or more. Moreover, the sampling interval is not limited to the frame interval of the video signal and may be arbitrarily set. This will be described in more detail below.

According to this embodiment, an example is used in which the video signal in NTSC system is sampled for full frames (at the rate of 30 frames per second). Nevertheless, the rate of 10 frames per second, for example, can also produce the same effect as the invention. The longer the sampling interval, however, the larger the visual field displacement between the input image and the selected reference background image, resulting in a more frequent detection error in the subtraction processing. The time t elapsed from the monitor start time (start time point of the predetermined change of the visual field) and the frame number (frame) hold the following relation:

$$t = \Delta t \times \text{frame} \quad (1)$$

where $\Delta t$ is the sampling interval in seconds. In the case where the sample operation is performed on the video signal in NTSC system for full frames, for example, $\Delta t = 1/30$ second. In the case where the rate is 10 frames per second, on the other hand, $\Delta t = 1/10$ second. Thus, the frame number can be calculated from the elapsed time t as follows (the numbers below decimal point is rounded):

$$\text{frame} = t/\Delta t \quad (2)$$

According to the method of synchronizing the input image and the reference background image to be selected, the frame number is calculated from equation (2) above using the time t elapsed from the monitor start time, and the reference background image of the calculated frame number is selected from the reference background sequential images.

A plurality of the reference background images are stored in the image memory 209 or the external storage unit 212. The recording format of a plurality of the reference background images (reference background moving picture) may be either a succession of reference background images for a predetermined number of frames or a compressed format such as MPEG (moving picture experts group) or the motion JPEG (motion joint photographic experts group).

In the subtraction processing step 303, the difference of the brightness value between the input image 901 and the reference background image 902 is calculated to produce a difference image 903 for each pixel.

In the binarization processing step 304, the difference image 903 obtained in the subtraction processing step 303 is processed using a predetermined threshold value Th (=20, for example) in such a manner that the brightness value of each pixel less than the threshold value Th is "0" and the brightness value not less than the threshold value Th is "255" (the brightness value calculated for each pixel in 8 bits) thereby to produce a binarized image 904.

In the intruding object existence determining step 305, it is determined that an intruding object exists in the presence of a cluster of pixels having the brightness value "255" in the binarized image 904. In that case, the process branches to the alarm/monitor display step 406. In the case where no such cluster is found, on the other hand, it is determined that there exists no intruding object and the process branches to the pixel input step 301.

The process of FIG. 3 will be explained with reference to FIG. 1. FIG. 1 is a diagram for explaining that the reference background image for the subtraction method shown in FIG. 9 is selected from a plurality of reference background images (reference background sequential images). Numeral 101 designates an input image, numeral 102 a reference background sequential images, numeral 103 a difference image, numeral 104 a binarized image, numeral 105 a reference background image selector, numeral 106 a subtractor, numeral 107 a binarizer, and numerals 102A, 102B, 102C, 102D, 102E, 102F, 102G reference background images included in the reference background sequential images 102. The input image 101, the difference image 103, the binarized image 104, the subtractor 106 and the binarizer 107 are substantially the same as the input image 901, the difference image 903, the binarized image 904, the subtractor 905 and the binarizer 906, respectively, described with reference to FIG. 9, and therefore will not be described in detail.

The reference background sequential images 102 contains in chronological order the reference background images 102A, 102B, 102C, 102D, 102E, 102F, 102G for a predetermined change of the monitor visual field, and the reference background image 102D having substantially the same angle of view corresponding to the input image 101, for example, is selected by the reference background image selector 105.

This reference background image selector 105 increases the frames (frame number) by the time the monitor operation has been performed. Even with a scene where the monitor visual field changes, therefore, the proper reference background image can be used and accurate detection of an intruding object is made possible.

FIG. 1 shows an example in which the imaging device is mounted at the head of a carrier moving on a predetermined speed profile along a predetermined track. In the absence of an object to be detected, the reference background sequential images is stored in the image memory 209 or the external storage unit 212 in the chronological order of acquisition as reference background images sampled at predetermined intervals (30 frames, for example) from the frame images picked up by the imaging device running along the predetermined track at a predetermined speed.

As an alternative, however, the imaging device may be fixed in position and panned and/or tilted (imaging direction) or the setting of the zoom ratio of the zoom lens of the imaging device may be changed appropriately.

Figure 4:
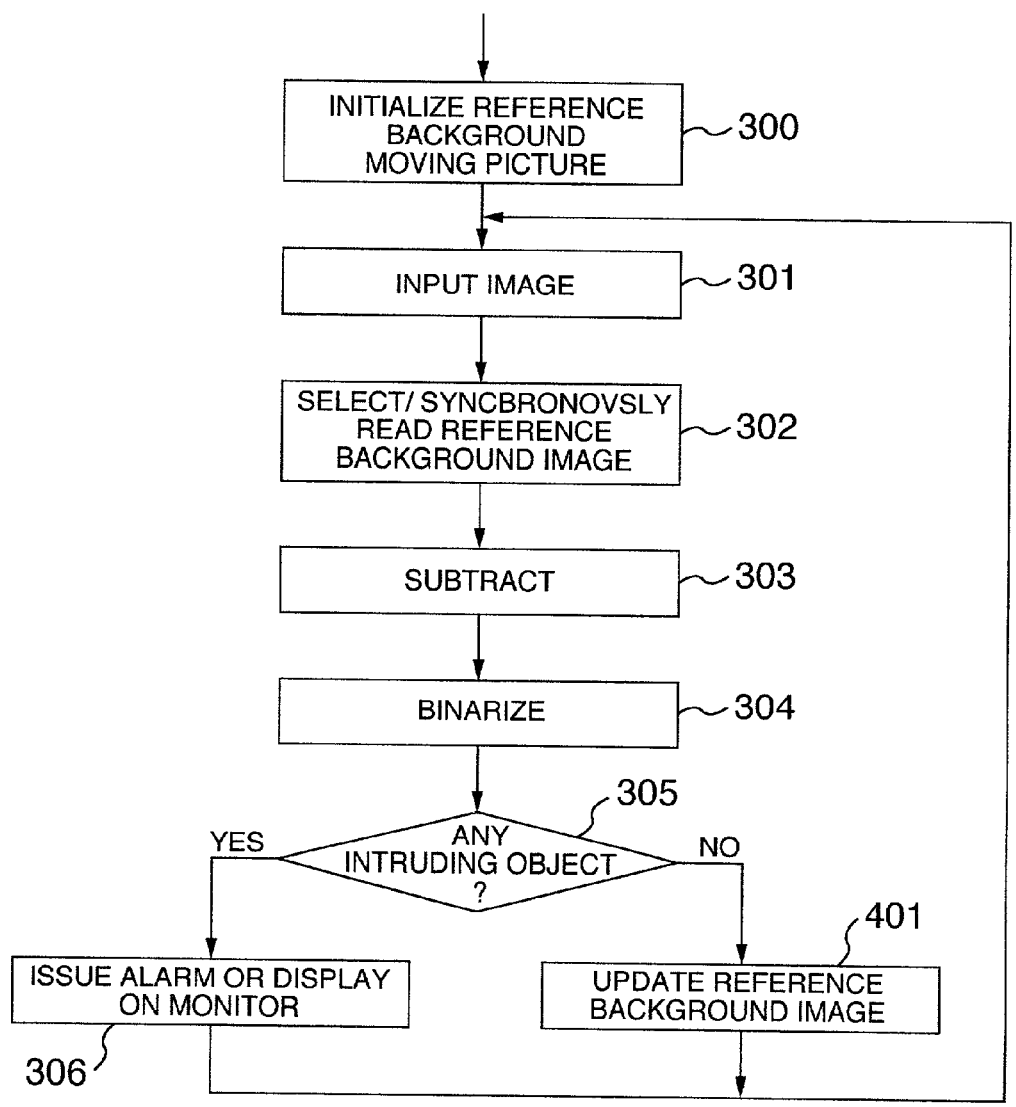
FIG. 4 is a flowchart showing the processing operation of an object detecting method according to another embodiment of the invention.

FIG. 4 is an example of flowchart for explaining the processing operation according to a second embodiment of the invention. FIG. 4 is a diagram similar to the flowchart of FIG. 3 to which the reference background moving picture update step 401 is added. In FIG. 4, the processing operation including the image input step 301 to the binarization processing step 304 and the alarm/monitor display step 406 are already explained with reference to FIG. 3 and will not be explained further. In similar fashion, in the flowcharts explained below, the steps of the same reference numerals have substantially the same function, respectively, and therefore will not be explained.

In the intruding object existence determining step 305, assume that a cluster of pixels having the brightness value "255" exists in the binarized image 904 obtained in the binarization processing step 304. The process proceeds to the alarm/monitor display step 306. In the case where it is determined in the intruding object existence determining step 305 that the binarized image 904 acquired from the binarization processing step 304 has not any cluster of pixels with the brightness value "255", on the other hand, the process proceeds to the reference background moving picture update step 401.

The reference background moving picture update step 401 is intended to update the reference background sequential images 102 upon determination of the intruding object existence determining step 305 that there exists no intruding object. Specifically, the reference background sequential images 102 can be updated by any method in which the input image 101 is reflected, in some form or other, in the reference background image 102D having the same angle of view corresponding to the input image 101. For example, the reference background image 102D may be replaced with the input image. As another alternative, the average value for each pixel of the reference background image 102D and the input image 101 is determined, and the image configured of each average value thus obtained can be used as a new reference background image 102D. In this way, even with a scene having a changing monitor visual field, the proper reference background image can be used while sequentially updating the reference background image, thereby making it possible to detect an intruding object accurately.

Figure 5:
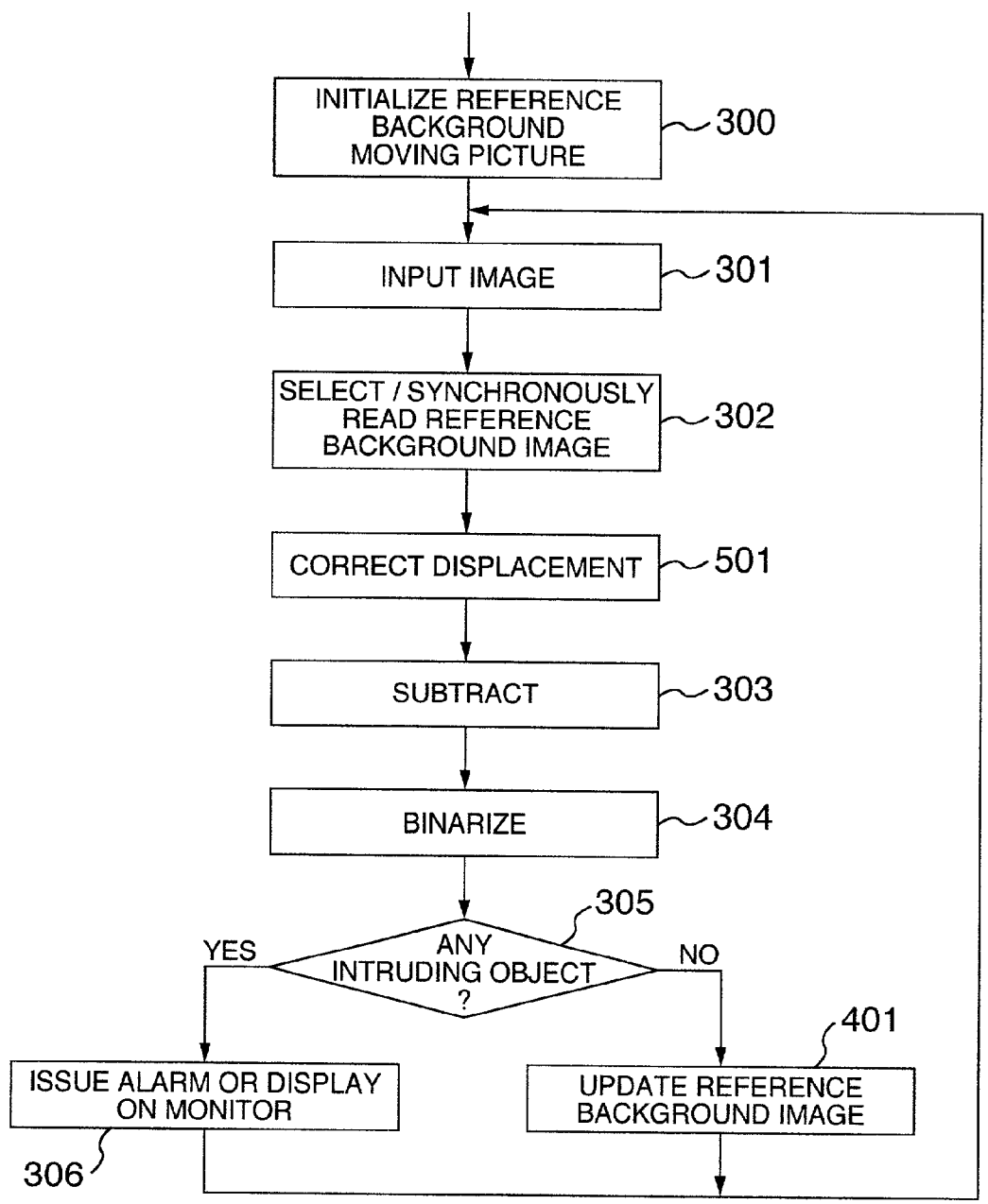
FIG. 5 is a flowchart showing the processing operation of an object detecting method according to still another embodiment of the invention.

FIG. 5 is an example of flowchart according to a third embodiment of the invention. In FIG. 5, a displacement correcting step 501 is inserted between the reference background image select step 302 and the subtraction processing step 303 in the flowchart of FIG. 4.

In the displacement correcting step 501, the amount of positional displacement between the input image 101 and the reference background image 102D caused by the tremble of the TV camera 201 in movement is calculated, and based on the calculated displacement amount, the position of the input image 101 on the screen is corrected. An example of the processing will be explained with reference to FIGS. 7A, 7B, 7C.

Figure 7A:
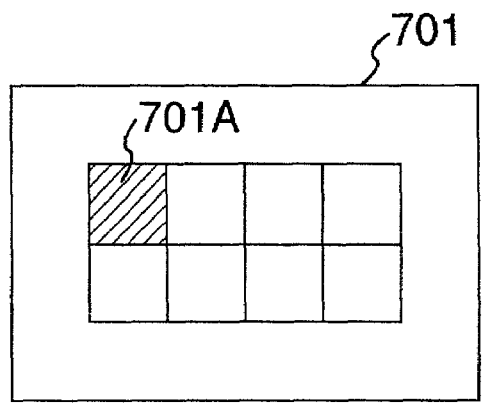
FIGS. 7A, 7B, 7C are diagrams for explaining the displacement between an input image and a reference background image.
Figure 7B:
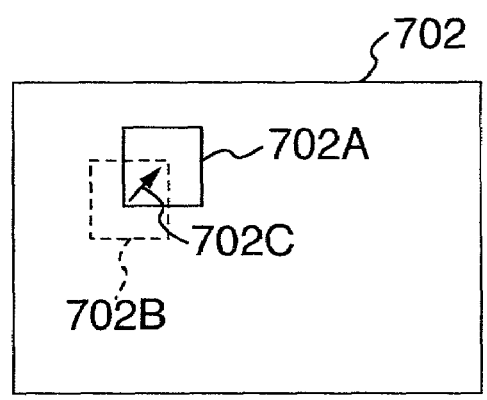
Figure 7C:
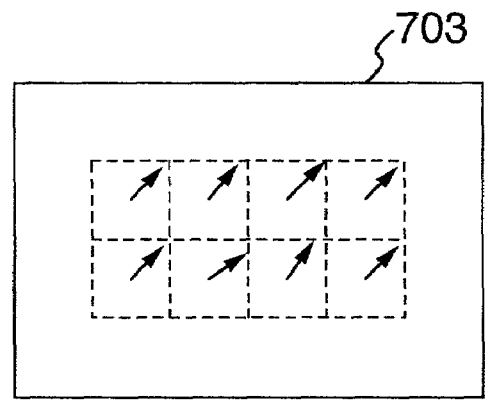

FIGS. 7A, 7B, 7C are diagrams for explaining a method of calculating the amount of positional displacement utilizing the template matching according to an embodiment. In FIG. 7A, numeral 701 designates a reference background image, and numeral 701A a section (block) arranged in the reference background image 701. In FIG. 7B, numeral 702 an input image, numeral 702A an area detected as the block 701A in the input image 702, and numeral 702B an area in the input image 702 at a position corresponding to the block 701A, and numeral 702C arrows indicating the amount of positional displacement between the area 702B and the area 702A. In FIG. 7C, numeral 703 shows an image indicating the distribution of the positional displacement amount for all the blocks in the reference background image 701.

In the processing method shown in FIGS. 7A, 7B, 7C, the reference background image 701 is divided into several sections (blocks) (eight, in the case under consideration), and it is determined by template matching at which position the image of each block is located on the input image.

In FIGS. 7A, 7B, 7C, the block 701A (the fully hatched area in the reference background image 701) is shown as an example. The image of the block 701A (indicated by the area 702B defined by a dotted line as a block in the input image 702) is detected as existent in the area 702A in the input image 702, and the positional displacement thereof is indicated by arrow 702C. In this way, FIG. 7C shows the positional displacement between the input image and the reference background image. Thus, the "positional displacement" or spatial deviation means a spatial displacement or deviation (up or down direction, right or left direction) of an input image relative to the reference background image.

The template matching is described in "Introduction to Computer Image Processing" by Hideyuki Tamura, p.118–125, published by Soken Shuppan, 1985, and also disclosed in "Digital Picture Processing" by Azriel Rosenfeld et al., ACADEMIC PRESS, pp.296–303, 1996, and U.S. Pat. No. 5,554,983, the disclosure of which are hereby incorporated by reference herein.

This template matching processing is carried out for all the blocks thereby to obtain the displacement distribution 703. The average of this distribution is the displacement amount v of the input image. In other words, the displacement amount vn of each block is expressed in equation (3) below.

$$vn=(xn, yn) \quad (3)$$

$$(n=1, 2, \ldots, N)$$

The displacement amount v of the input image is given by equations (4) and (5).

$$v=(dx, dy) \quad (4)$$

$$\left. \begin{array}{l} dx = \dfrac{1}{N}\sum_{i=1}^{N} xn \\ dy = \dfrac{1}{N}\sum_{i=1}^{N} yn \end{array} \right\} \quad (5)$$

where N is the number (8 in the example taken here) of blocks (sections).

Then, equation (6) is calculated for v=(dx, dy), where f(x, y) designates an input image, and f'(x, y) an input image of which the displacement has been corrected.

$$f'(x, y)=f(x-dx, y-dy) \quad (6)$$

In this way, the displacement which may exist between the input image 101 and the reference background image 102D in a given scene can be corrected and accurate detection of an intruding object is made possible.

Figure 6:
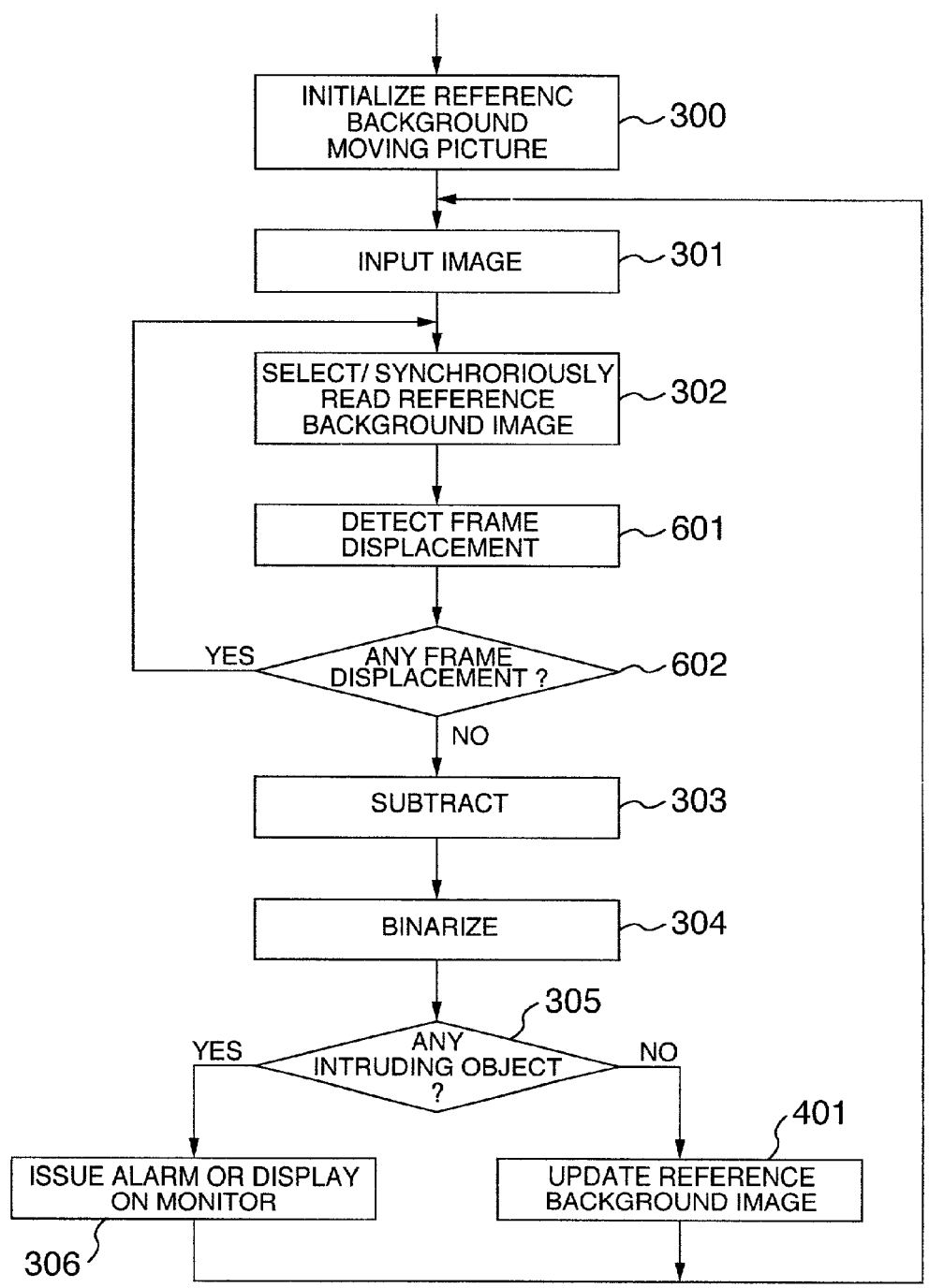
FIG. 6 is a flowchart showing the processing operation of an object detecting method according to a further embodiment of the invention.

FIG. 6 is an example of flowchart according to a fourth embodiment of the invention. The flowchart of FIG. 6 is obtained by adding a frame displacement detection step 601 and a branching step 602 for branching the process to execute the reference background image select step 302 again in the presence of a frame displacement are added to the flowchart of FIG. 4.

Figure 8A:
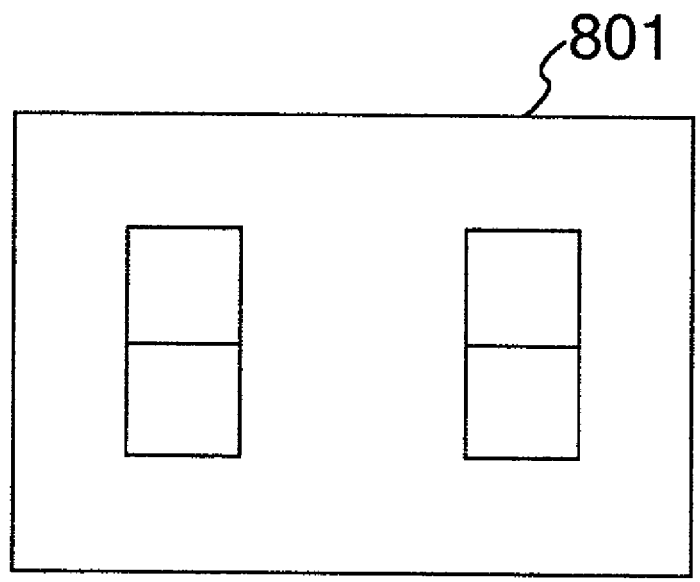
FIGS. 8A, 8B are diagrams for explaining the frame displacement between an input image and a reference background image.
Figure 8B:
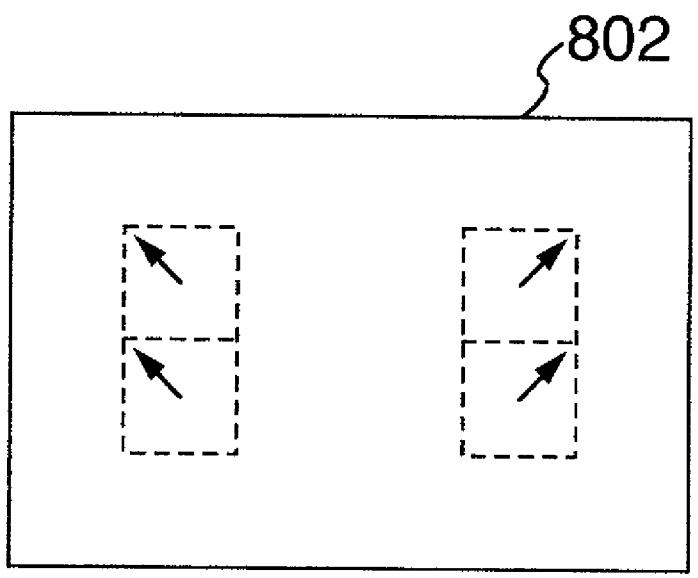

The frame displacement detection step 601 is for determining the time lag between the input image 101 and the selected reference background image 102D. An embodiment of the processing will be explained with reference to FIGS. 8A, 8B and 11. FIGS. 8A, 8B are diagrams showing a method of determining the frame displacement utilizing the template matching. In FIG. 8A, numeral 801 designates a reference background image. In FIG. 8B, numeral 802 designates an image indicating the distribution of the frame displacement amount for all the blocks in which the reference background image 801 is divided.

The reference background image 801 is divided into several blocks in the left and right parts of the screen (two each in the left and right parts in the embodiment shown in FIGS. 8A, 8B), and as in FIGS. 7A, 7B, 7C, the position at which the image of each block is located on the input image is determined by template matching.

This determining process will be explained with reference to FIGS. 11A, 11B, 11C, 11D. FIGS. 11A to 11*d* show an example assuming the same scene as in FIG. 1. In FIG. 11A, numeral 1101 designates an input image. In FIG. 11B, numeral 1111 designates a selected reference background image. The areas 1102, 1103, 1104, 1105 designate the blocks described with reference to FIG. 8A and represent a case in which two blocks are arranged in each of the left and right parts of the screen as in FIG. 8A. In the reference background image 1111, the areas 1112*a*, 1113*a*, 1114*a*, 1115*a* defined by dotted lines designate the areas corresponding to the areas 1102, 1103, 1104, 1105, respectively, of the blocks in the input image 1101. The areas 1112*b*, 1113*b*, 1114*b*, 1115*b* can be obtained by template matching using the images of the areas 1102, 1103, 1104, 1105, respectively. The position change from the center of the areas 1112*a*, 1113*a*, 1114*a*, 1115*a* to the center of the areas 1112*b*, 1113*b*, 1114*b*, 1115*b*, respectively, represents the displacement of each block (indicated by arrows 1112*c*, 1113*c*, 1114*c*, 1115*c*, respectively). The amount of each of these displacements is expressed as V1=(X1, Y1), V2=(X2, Y2), V3=(X3, Y3), V4=(X4, Y4), respectively. In this case, V1, V2 indicate the displacement on the left side of the screen, and V3, V4 the displacement on right side of the screen.

Further, from the average displacement amount of the left and right blocks, the average displacement amount of the block on the left side of the screen is obtained as vL=(xL, yL), while the average displacement amount of the block on the right side of the screen is obtained as vR=(xR, yR).

Specifically, the average displacement on the left and right sides of the screen are obtained as xL=(X1+X2)/2, yL=(Y1+Y2)/2, xR=(X2+X4)/2, yR=(Y3+Y4)/3. In the case of FIG. 11 involving the input image 1101 and the reference background image 1111, xL is negative (the direction from the upper left part to the lower right part of the screen is deemed as positive direction), and xR assumes a positive value (i.e. the arrows 1112*c*, 1113*c*, 1114*c*, 115*c* are directed from center outward of the screen). This indicates that the reference background image 1111 is temporally ahead of the input image 1101 (frame is larger than the proper value). Thus, one frame is reduced in the case where xR−xL is not less than a predetermined size Tf.

Now, an opposite example will be explained with reference to FIGS. 11C, 11D. In FIG. 11C, numeral 1121 designates an input image. In FIG. 11D, numeral 1131 designates a selected reference background image. As in the case involving the input image 1101 and the reference background image 1111 described above, the areas 1122, 1123, 1124, 1125 represent the blocks described with reference to FIG. 8. In the reference background image 1131, the areas 1132*a*, 1133*a*, 1134*a*, 1135*a* defined by dotted lines correspond to the block areas 1122, 1123, 1124, 1125, respectively, in the input image 1121. The areas 1132*b*, 1133*b*, 1134*b*, 1135*b*, on the other hand, are obtained by template matching using the images of the areas 1122, 1123, 1124, 1125, respectively. In the process, the position change from the center of the areas 1132*a*, 1133*a*, 1134*a*, 1135*a* to the center of the areas 1132*b*, 1133*b*, 1134*b*, 1135*b*, respectively, indicates the displacement of each block (expressed by arrows 1132*b*, 1133*b*, 1134*b*, 1135*b*, respectively), and each position displacement amount is expressed as V1=(X1, Y1), V2=(X2, Y2), V3=(X3, Y3), V4=(X4, Y4), respectively. In this case, V1, V2 designate the displacement on the left side of the screen, and V3, V4 the displacement on the right side of the screen. Further, the average displacement on the left and right sides of the screen is obtained as xL=(X1+X2)/2, yL=(Y1+Y2)/2, xR=(X3+X4)/2, yR=(Y3+Y4)/2. In the case FIG. 11 involving the input image 1121 and the reference background image 1131, xL assumes a positive value and xR a negative value (i.e. the arrows 1112*c*, 1113*c*, 1114*c*, 115*c* are directed to the center inward from outside of the screen). This indicates that the reference background image 1131 temporally lags behind the input image 1121 (the frame is smaller than the proper value). In the case where xL−xR is not less than a predetermined magnitude Tf, therefore, one frame is increased, where Tf designates an allowable amount of displacement of the pixel caused by the frame displacement, which value is empirically obtained and set to Tf=5, for example, in this embodiment.

According to this embodiment, a total of four blocks, two each on left and right sides of the screen as in FIG. 8A, are shown as an example. Nevertheless, any other number of blocks or different numbers of blocks in left and right sides may be arranged with equal effect.

Then, in the branching step 602, the process branches in such a manner as to execute the reference background image select step 302 again in the case where the frame is corrected. By doing so, the frame displacement can be corrected and accurate detection of an intruding object is made possible even in the case where the imaging device is moving along the optical axis thereof and a time lag exists between the input image 101 and the reference background image 102D. Thus, the "frame displacement" or temporal deviation means a displacement or deviation between the proper reference background image which correctly corresponds to the input image and the reference background image actually selected by the reference background image selector 105.

Now, a fifth embodiment of the invention will be explained. The fifth embodiment of the invention is intended to detect an object intruding into the visual field of the imaging device while periodically changing the imaging direction and the zoom ratio of the TV camera 201 by the pan and tilt head 202 and the zoom lens 203.

Specifically, in the absence of an intruding object to be detected, the pan and tilt head 202 and the zoom lens 203 are controlled by a control signal so that the imaging direction and the zoom ratio of the zoom lens 203 of the TV camera 201 are changed by an amount equivalent to one period, and the resulting input image is contained in the reference background image and the reference background sequential images 102.

The reference background image selector 105 resets the frame to 0 upon completion of a period of monitor operation.

Figure 12:
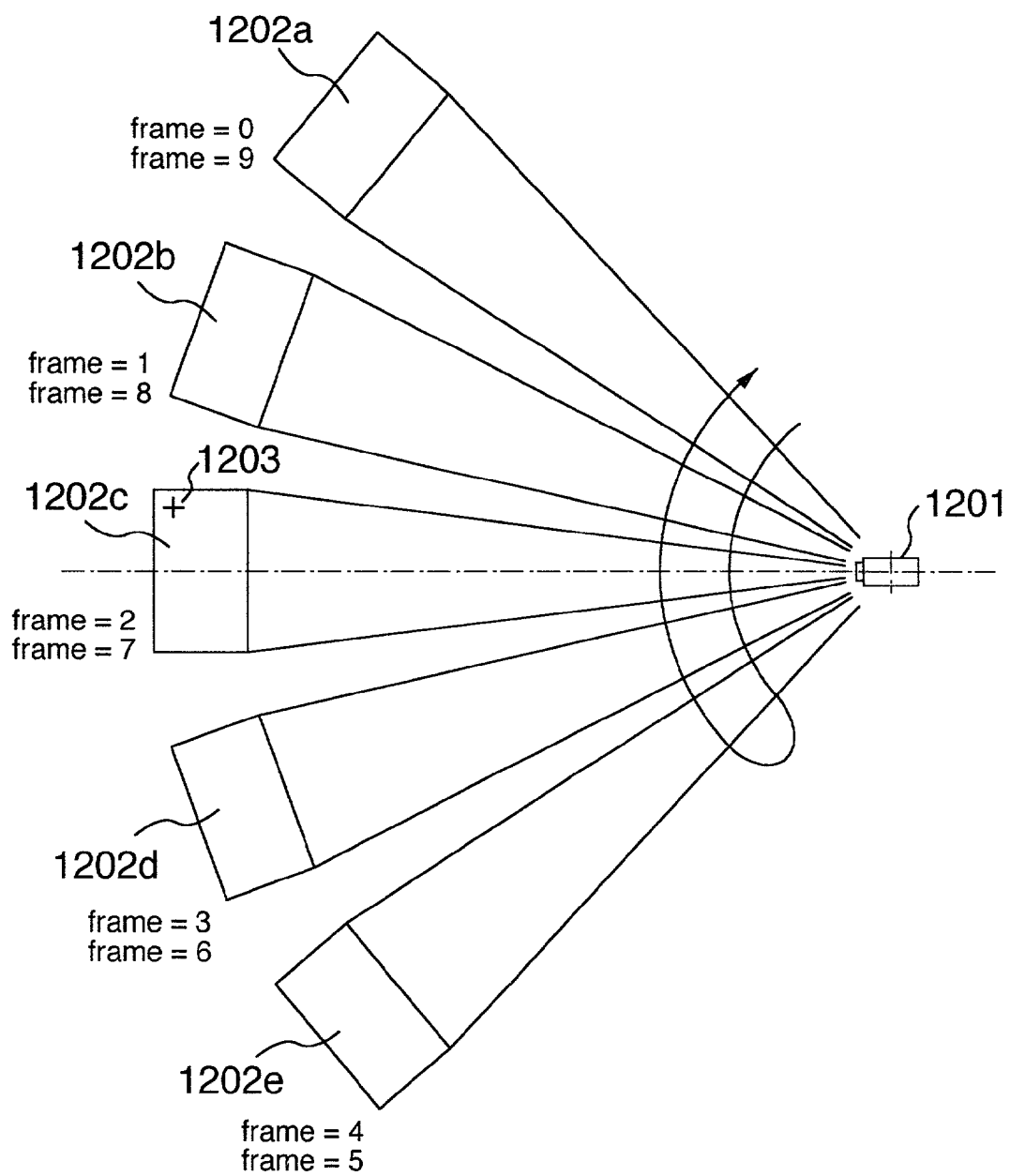
FIG. 12 is a diagram for explaining an object detecting method according to a still further embodiment of the invention.

This process will be explained with reference to FIG. 12. FIG. 12 shows a case in which the viewing direction of the TV camera 1201 is changed from frame number 0 to 9. In FIG. 12, for facilitating the understanding, the change only in the viewing direction is displayed, and an example is shown in which the imaging visual field (input image) is periodically changed in the order of 1202a, 1202b, 1202c, 1202d, 1202e. At the monitor start time point (frame=0), the imaging visual field is 1202a, which changes to 1202b, 1202c, 1202d, 1202e, 1202e, 1202d, 1202c, 1202b, 1202a with the progress of the monitor processing. At the same time, the frame also changes from 0 to 9. According to a fifth embodiment of the invention, the frame number is set to 0 when the imaging visual field returns to 1202a. By doing so, even in the case where the frame displacement develops when changing the viewing direction (in the case where the input image and the reference background image go out of phase), the input image and the reference background image can be synchronized with each other at the time point when the imaging visual field returns to 1202a. Also, a specific pattern like a mark such as a cross 1203 is preset in the imaging visual field 1202c, for example, and the very instant the particular pattern of the mark is displayed in the input image, the frame number is corrected to a predetermined value (in the case of FIG. 12, frame is set to 2 when the imaging visual field is directed from 1202a to 1202e, and frame is set to 7 when the imaging visual field is directed from 1202e to 1202a). By doing so, even in the case where the frame displacement occurs, the frame number can be corrected to a proper value, the instant the pattern providing the mark is displayed. This correction can be realized by at least one of the indexes including the position information of the imaging device (the information such as a predetermined reference position in the aforementioned case) and the imaging visual field information (the information such as a pattern providing a specific mark in the aforementioned case).

Thus, according to this invention, even in the case where the setting of the pan and tilt head 202 and the zoom lens 203 are periodically changed, the proper reference background image can be obtained and an intruding object can be accurately detected.

According to a sixth embodiment of the invention, the imaging device is mounted on a vehicle such as a train running on a predetermined track, and the input image obtained in the absence of an intruding object is contained as a reference background image in a reference background sequential images 102. According to this invention, therefore, even in the case where the imaging device is mounted on a vehicle running on a predetermined track, the proper reference background image can be obtained and an intruding object can be accurately detected.

The flowcharts of FIGS. 3 to 6 showing the embodiments refer to the case in which the processing operation for detecting an object or an intruding object is not terminated midway. In the hardware configuration of the intruding object monitoring apparatus described with reference to FIG. 2, however, it is apparent that the processing operation is terminated midway upon termination of the operation of the monitoring apparatus due to an incident such as power failure or at the will of the user.

Upon termination of the processing operation, the detection result so far obtained and the reference background image may be held in an arbitrary storage unit such as a (nonvolatile) work memory or an external memory to enable them to be effectively reused at the subsequent time of the operation restart.

As described above, according to this embodiment, a reference background sequential images containing the reference background images of two or more frames is stored against such a predetermined change of the imaging position as a change of the imaging direction or the zoom ratio of the imaging device, and when the difference of brightness is calculated, the proper reference background image is used from the reference background sequential images. In this way, even in the case where the imaging position changes accompanied by a change in the setting of the zoom ratio of the zoom lens or the imaging direction of the imaging device, an intruding object located in the imaging visual field can be detected, thereby greatly widening the range of application of the intruding object detecting apparatus.

For example, the intruding object detecting apparatus according to the invention can be mounted on a mobile unit (such as a train or a pan-tilt camera whose moving route is determined) to detect an object using the image taken by the camera which undergoes a constant change of the visual field.

The invention claimed is:

1. An object detecting method for detecting an object in a predetermined monitor area, comprising the steps of:
   imaging a plurality of different areas in said predetermined monitor area having no object at a predetermined time by an imaging device and registering respective images corresponding to said different areas having no image of said object to be detected;

at a different time from said predetermined time, imaging said predetermined monitor area by said imaging device;

comparing an image from said imaging device with a corresponding one of said plurality of registered images; and detecting said object to be detected based on a result of the comparison, wherein said plurality of registered images are reference background sequential images and said step of comparing is subtraction processing between said image from said imaging device and said corresponding one of said reference background sequential images.

2. A method according to claim 1, further comprising the step of detecting a displacement between the image from the imaging device and a corresponding reference background image, then correcting the image from said imaging device in accordance with the detected displacement, wherein said subtraction processing is carried out between the corrected image and the corresponding reference background image.

3. A method according to claim 2, wherein said step of detecting the displacement includes the step of applying a template matching between said image from said imaging device and the corresponding reference background image to detect said displacement.

4. A method according to claim 3,
wherein said template matching step is such that the reference background image is divided into a plurality of sections,
wherein said image from said imaging device is subjected to said template matching using the image of each section as a template, and
wherein an average of displacements detected is used as said displacement.

5. A method according to claim 1, further comprising the step of detecting a frame displacement between the frame of the image from the imaging device and the frame of said corresponding reference background image, wherein when there is any frame displacement, a different reference background image is selected.

6. A method according to claim 5, wherein said frame displacement detecting step includes the step of applying a template matching between said image from said imaging device and said corresponding reference background image and detecting a frame displacement.

7. A method according to claim 6,
wherein said template matching step is such that said corresponding reference background image is divided into a plurality of sections, and using the image of each section as a template, the template matching is carried out with said image from said imaging device, and
wherein in accordance with frame displacement information detected, a reference background image of the frame temporally ahead of or lagging behind the frame of said reference background image is selected.

8. A method according to claim 5, wherein said frame displacement detecting step corrects the frame displacement based on at least one of a position and imaging visual field information of said imaging device.

9. A method according to claim 8, wherein a specific position of the imaging device and a specific frame of the reference background image corresponding to said specific position are set in association with each other in advance, and when the imaging device arrives at said specific position, the frame displacement is corrected using the reference background image of said specific frame.

10. A method according to claim 8,
wherein said imaging visual field information contains a specific object within the predetermined monitor visual field as a mark, and said mark and the reference background image of a specific frame corresponding to said mark are set in association with each other in advance, and
wherein when the imaging device picks up the image of said mark, the frame displacement is corrected using the reference background image of the specific frame.

11. A method according to claim 1, further comprising the step of updating the reference background sequential images to update at least one of the reference background sequential images.

12. A method according to claim 11, wherein said update step functions in such a manner that when an object is not detected in said image from said imaging device in said object detection processing step, said corresponding reference background image is updated with said image.

13. An object detecting method for detecting an object in a predetermined monitor area, comprising the steps of:
imaging a plurality of different areas in the predetermined monitor area at a predetermined time by the imaging device in accordance with a predetermined scanning pattern, and registering respective reference background sequential images corresponding to said different areas in a storage device;
at a different time from said predetermined time, imaging said predetermined monitor area by said imaging device substantially in accordance with said predetermined scanning pattern in synchronism with the operation of reading said registered reference background sequential images from the storage device;
carrying out the subtraction processing between the images from the imaging device and the reference background sequential images read out; and
carrying out object detection processing based on a result of the subtraction processing.

14. A method according to claim 13, wherein said predetermined scanning pattern is a predetermined chronological change of at least one or a combination of two or more of the zoom ratio of a zoom lens of said imaging device, an imaging direction and a track along which said imaging device moves.

15. A method according to claim 13, wherein said predetermined scanning pattern is such that said imaging device moves on a predetermined speed profile along a predetermined moving track.

16. A method according to claim 13, wherein said predetermined scanning pattern is such that the position of the imaging device is fixed while the zoom ratio and the imaging direction of the imaging device periodically change.

17. A method according to claim 13,
wherein said reference background sequential images are a set of images obtained by scanning said predetermined monitor area having no object with the imaging device according to the predetermined scanning pattern and sampling the images from said imaging device at predetermined sampling intervals,
wherein said registration step is such that each image of said reference background sequential images is registered by being assigned a frame number in order of sampling, and
wherein said imaging step is such that the imaging operation of the imaging device and the operation of reading the reference background image from the storage device are carried out in synchronism with each other using the frame number, so that a reference background image corresponding to said image from the imaging device is selected from the reference background sequential images.

18. A method according to claim 17,
wherein the frame number of the corresponding reference background image is calculated from a relation between the time elapsed from start of monitoring to the present point in time and the predetermined sampling interval, and
wherein the imaging operation of the imaging device and the operation of reading the reference background image from the storage device are synchronized with each other using said calculated frame number.

19. A method according to claim 18, further comprising the step of detecting a frame displacement between the image from the imaging device and said selected reference background image, wherein in the presence of a frame displacement, another reference background image is selected.

20. A method according to claim 19, wherein said frame displacement detection step includes the template matching step for detecting the frame displacement by template matching between said image from said imaging device and said selected reference background image.

21. A method according to claim 20, wherein said template matching step includes the substeps of:
dividing said selected reference background image into a plurality of sections;
carrying out the template matching on said image from said imaging device using the image of each of said section as a template; and
selecting a reference background image temporally ahead of or lagging behind said selected reference background image in accordance with the detected displacement information.

22. A method according to claim 19, wherein said frame displacement detection step is such that said frame displacement is corrected based on at least one of a position of said imaging device and imaging visual field information.

23. A method according to claim 22, wherein a specific position of said imaging device and a specific frame number of the reference background image corresponding to said specific position are set in association with each other in advance, and when said imaging device reaches said specific position, said frame displacement is corrected using said specific frame number.

24. A method according to claim 22,
wherein said imaging visual field information contains a specific object located within said predetermined monitor area as a mark,
wherein said mark and a specific frame number of the reference background image corresponding to said mark are set in association with each other in advance, and
wherein when said imaging device picks up the image of said mark, said frame displacement is corrected using said specific frame number.

25. A method according to claim 13, further comprising the step of detecting a spatial displacement between said image from said imaging device and said reference background image that has been read, and correcting said read image in accordance with said detected spatial displacement, said subtraction processing being carried out using said corrected image.

26. An object detecting apparatus for detecting an object located within a predetermined monitor area, comprising:
an imaging device;
an image input interface connected to said imaging device for converting a video signal of the imaging device to image data;
a processing unit including a central processing unit and a memory for processing said image data; and
a bus for interconnecting said image input interface and said processing unit;
wherein in order to detect the object, said processing unit controls said object detecting apparatus such that:
images from said imaging device imaging said predetermined monitor area having no object to be detected are stored sequentially in said memory,
an image from said imaging device imaging said predetermined monitor area in accordance with a predetermined scanning pattern is sequentially inputted to said processing unit,
an image having no object to be detected corresponding to said inputted image is read out of said memory, and
said input image and said read image having no object to be detected are compared and based on a result of comparison, object detection processing is carried out,
wherein said frame images having no image of said object to be detected are reference background sequential images and said comparing including subjecting said image from said imaging device and said corresponding image having no image of said object to be detected to subtraction processing.

27. An image detecting apparatus for detecting an object located within a predetermined monitor area, comprising:
an imaging device;
an image input interface connected to said imaging device for converting a video signal of the imaging device to image data;
a processing unit including a central processing unit and a memory for processing said image data; and
a bus for interconnecting said image input interface and said processing unit,
wherein in order to detect the object, said processing unit controls said object detecting apparatus to:
store in said memory a plurality of images having different visual fields from said imaging device which images said predetermined monitor area at different visual fields,
read out of said memory a stored image which corresponds to an image output from said imaging device, and
compare said input image with said image read out of said memory and perform object detection processing based on said comparison.

28. An apparatus according to claim 27, further comprising a zoom lens control unit connected to said bus for changing a zoom ratio of a zoom lens of said imaging device, and a pan and tilt head control unit for changing an imaging direction of said imaging device.

29. An apparatus according to claim 27, wherein said imaging device is mounted on a moving unit.

30. An apparatus according to claim 29, wherein said moving unit includes a mobile unit.

31. An apparatus according to claim 29, wherein said moving device includes a pan and tilt head.

32. An object detecting apparatus for detecting an object within a predetermined monitor area, comprising:
an imaging device;
an image input interface connected to the imaging device for converting a video signal from the imaging device to image data;

a processing unit including a central processing unit and a memory for processing the image data; and a bus for interconnecting the image input interface and the processing unit;

wherein in order to detect the object, said processing unit controls said detecting apparatus such that:

an image from said imaging device imaging said predetermined monitor area having no object to be detected is recorded in said memory beforehand as a reference background image of reference background sequential images;

an image from the imaging device imaging the predetermined monitor area in accordance with a predetermined scanning pattern is sequentially inputted to the processing unit;

a reference background image is read out of said reference background sequential images from the image memory in synchronism with picking up the input frame images; and a difference in a pixel value between the input image and the read reference background image is calculated for each pixel, and an area associated with a large difference value is detected as an object.

33. A monitoring apparatus for monitoring an object intruding into a predetermined monitor area, comprising:

an imaging device;

an image input interface connected to the imaging device for converting a video signal from the imaging device to image data;

a processing unit including a central processing unit and a memory for processing said image data;

a monitor; and a bus for interconnecting said image input interface and said processing unit;

wherein said processing unit controls said monitoring apparatus such that:

each n-th image from the imaging device imaging the predetermined monitor area having no object to be detected is recorded in the memory beforehand as reference background sequential images, where n is an integer not less than unity;

an image from the imaging device imaging the predetermined monitor area is sequentially input to the processing unit;

a reference background image corresponding to the input image is read from the memory; and a difference in a pixel value between the input image and the reference background image corresponding to the input image read is calculated for each pixel, and an area associated with a large difference value is detected as an object and displayed on said monitor.

34. A monitoring apparatus for monitoring an object intruding into a predetermined monitor area, comprising:

an imaging device;

an image input interface connected to said imaging device for converting a video signal from the imaging device to image data;

a processing unit including a central processing unit and a memory for processing said image data;

a monitor; and a bus for interconnecting the image input interface, the processing unit and the monitor;

wherein said processing unit controls said monitoring apparatus such that:

each n-th image from the imaging device imaging the predetermined monitor area having no object to be detected is recorded in the memory beforehand as reference background sequential images, where n is an integer not less than unity;

images from the imaging device imaging the predetermined monitor area in accordance with a predetermined scanning pattern are sequentially input to the processing unit;

reference background sequential images are read from the memory in synchronism with the operation of picking up the input images; and a difference in a pixel value between an input image and a reference background image read is calculated for each pixel, and an area associated with a large difference value is detected as an object and displayed on the monitor.

35. An apparatus according to claim 27, wherein said plurality of images having different visual fields stored in said memory are reference background images, respectively, and said comparison of said inputted image with said image read out of said memory includes subtraction processing between said inputted image and a reference background image corresponding to said inputted image.

* * * * *